United States Patent

Tomimatsu et al.

[11] Patent Number: 5,595,832
[45] Date of Patent: Jan. 21, 1997

[54] MOLTEN CARBONATE FUEL CELL

[75] Inventors: Norihiro Tomimatsu, Kawasaki; Hideyuki Ohzu; Yoshihiro Akasaka, both of Yokohama; Kazuaki Nakagawa, Urayasu; Hiroshi Tateishi, Yokohama, all of Japan

[73] Assignee: Kabushiki Kaisha Toshiba, Kawasaki, Japan

[21] Appl. No.: 299,652

[22] Filed: Sep. 2, 1994

[30] Foreign Application Priority Data

Sep. 3, 1993 [JP] Japan .................................. 5-219305

[51] Int. Cl.$^6$ ........................................................ H01M 8/14
[52] U.S. Cl. ......................... 429/16; 429/41; 429/46
[58] Field of Search ........................... 429/46, 12, 41, 429/26, 16, 188

[56] References Cited

U.S. PATENT DOCUMENTS 5,256,498  10/1993  Ohzu et al. .............................. 429/16
5,316,555  5/1994   Ong et al. .............................. 29/623.1

FOREIGN PATENT DOCUMENTS 54-3236     1/1979   Japan .
58-71564    4/1983   Japan .
58-128670   8/1983   Japan .
58-12977    8/1983   Japan .
63-294668   12/1988  Japan .

*Primary Examiner*—M. Nuzzolillo
*Attorney, Agent, or Firm*—Oblon, Spivak, McClelland, Maier & Neustadt, P.C.

[57] ABSTRACT

Disclosed is a molten carbonate fuel cell comprising an electrolyte body sandwiched between a pair of electrodes, outflow of an electrolyte from the electrolyte body being diminished to suppress an increase of the internal resistance and occurrence of a gas crossover, which accompany the outflow of the electrolyte, so as to increase the life time of the fuel cell. The molten carbonate fuel cell of the present invention comprises a pair of conductive electrodes, an electrolyte body sandwiched between the pair of electrodes and including a porous body containing a retaining material and a reinforcing material and an electrolyte impregnated in the porous body and containing an alkali carbonate mixture, the retaining material containing fine particles having an average particle diameter of 0.2 to 0.6 μm and the reinforcing material containing short fibers having a diameter of 0.5 to 5 μm and a length of at most 50 μm, fuel gas supplying means for supplying a fuel gas to one of the pair of electrodes, and oxidant gas supplying means for supplying an oxidant gas to the other of the pair of electrodes.

22 Claims, 2 Drawing Sheets

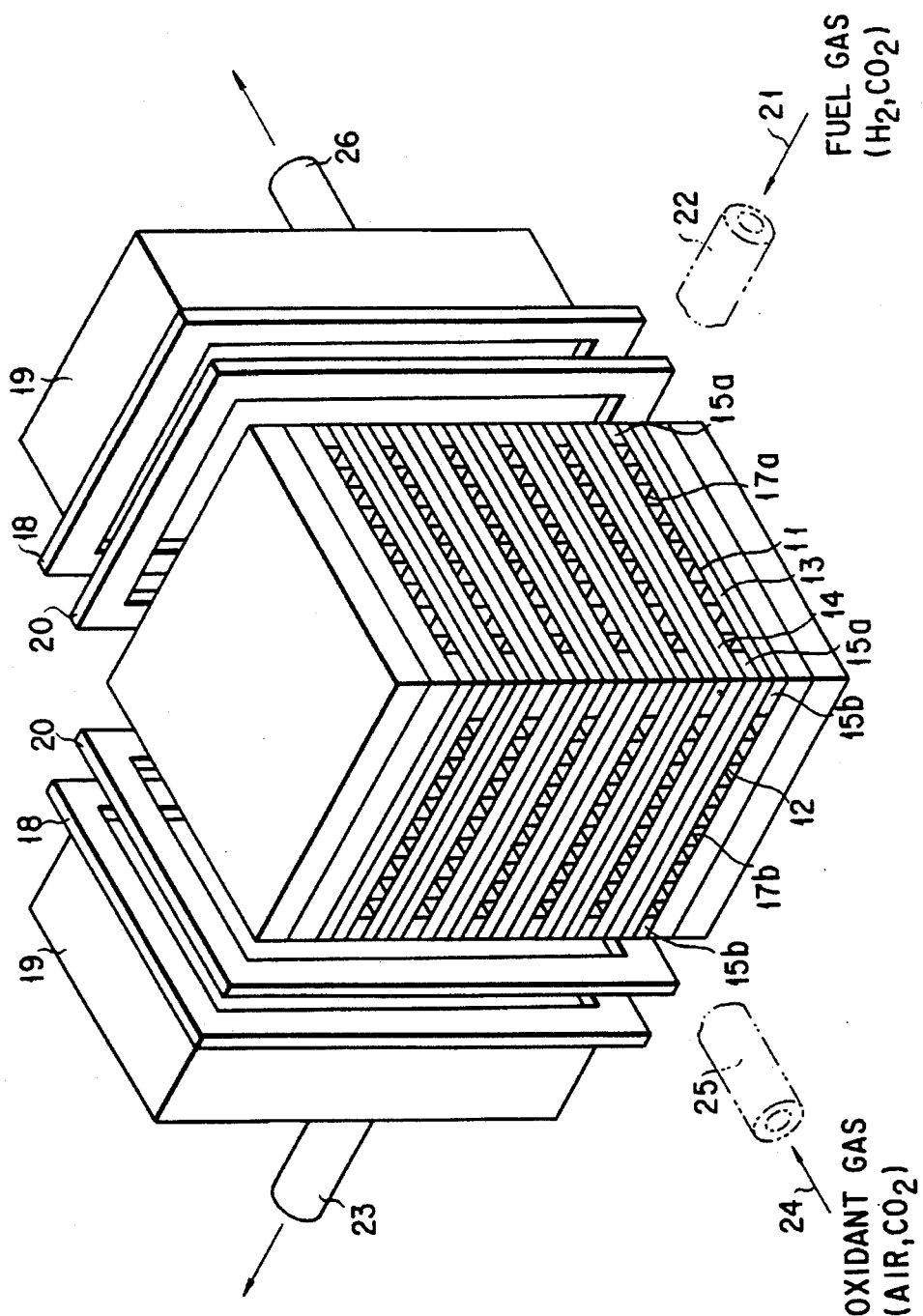
F I G. 2

MOLTEN CARBONATE FUEL CELL

BACKGROUND OF THE INVENTION

1. Field of the Invention

The present invention relates to a molten carbonate fuel cell and, more particularly, to a molten carbonate fuel cell in which an electrolyte body sandwiched between a pair of electrodes is improved.

2. Description of the Related Art

A basic structure of a molten carbonate fuel cell is shown in FIG. 1. An electrolyte body 3 retaining an electrolyte consisting of an alkali carbonate is sandwiched between an anode (fuel electrode) 1 and a cathode (air electrode) 2 which serve as a pair of electrodes. Two housings 4a and 4b abut against peripheral portions of both surfaces of the electrolyte body 3. The anode 1 and the cathode 2 are stored in the housings 4a and 4b, respectively. A supply port 6 for supplying fuel gas ($H_2$ and $CO_2$) to the anode 1 and an exhaust port 7 for exhausting exhaust gas ($CO_2$ and $H_2O$) from the anode 1 are formed in the housing 4a in which the anode 1 is arranged. A supply port 8 for supplying an oxidant gas (air and $CO_2$) to the cathode 2 and an exhaust port 9 for exhausting an exhaust gas ($N_2$) from the cathode 2 are formed in the housing 4b in which the cathode 2 is arranged.

In the molten carbonate fuel cell shown in FIG. 1, an alkali carbonate mixture in the electrolyte body 3 is melted at a high temperature. The fuel gas ($H_2$ and $CO_2$) is supplied to the anode 1 through the supply port 6 of the housing 4a, while the oxidant gas (air and $CO_2$) is supplied to the cathode 2 through the supply port 8 of the housing 4b, thereby causing a reaction represented by formula (1) at the anode 1 and a reaction represented by formula (2) at the cathode 2:

$$H_2 + CO_3^{2-} \rightarrow H_2O + CO_2 + 2e^- \quad (1)$$

$$\tfrac{1}{2}O_2 + CO_2 + 2e^- \rightarrow CO_3^{2-} \quad (2)$$

As described above, the electrolyte is melted during operation of the cell. To prevent the molten electrolyte from flowing to the outside, the electrolyte body 3 is formed of a porous body of particles (to be referred to as retaining particles hereinafter). The porous body is impregnated in general with an electrolyte consisting of an alkali carbonate mixture containing at least two carbonates selected from the group consisting of $Li_2CO_3$, $K_2CO_3$, and $Na_2CO_3$. Fine particles selected from the group consisting of $\alpha$-$LiAlO_2$ particles, $\beta$-$LiAlO_2$ particles, and $\gamma$-$LiAlO_2$ particles each having a particle diameter of 0.05 μm to 0.2 μm are used as the retaining particles.

The electrolyte body used in the molten carbonate fuel cell serves not only a medium for migration of carbonate ions ($CO_3^{2-}$) but also a gas permeation barrier layer for inhibiting direct mixture (gas crossover) of reaction gases between the anode and the cathode. In order to perform these functions, the electrolyte must be sufficiently retained in the electrolyte body. An outflow of the electrolyte, i.e., electrolyte loss increases an internal resistance and occurrence of a gas crossover.

Japanese Patent Disclosure (Kokai) No. 63-294668 discloses a method of manufacturing an electrolyte body. It is disclosed that retaining particles consisting of $\alpha$-$LiAlO_2$ having a particle diameter of 0.05 μm to 0.2 μm are formed into a porous sheet by using a paper machine, followed by impregnating the porous sheet with an electrolyte consisting of an alkali carbonate mixture so as to obtain a desired electrolyte body. However, the porous body of the electrolyte body is cracked by heat cycles taking place when the operation of the fuel cell is started and stopped, leading to occurrence of a gas crossover.

Japanese Patent Disclosure No. 58-71564 discloses an electrolyte body having a porous body prepared by adding reinforcing particles having a diameter of at least 25 μm to the fine retaining particles noted above. It is also disclosed that the porous body of the electrolyte body can be prepared by adding a long fibrous reinforcing material having a large diameter to the fine retaining particles. However, agglomeration and coalescence take place between the retaining particles and the reinforcing material forming the porous body during operation of the fuel cell, leading to changes in fine structure of the porous body and, thus, to outflow of the electrolyte. As a result, the internal resistance is increased, and a gas crossover is generated. It follows that the life of the fuel cell is shortened.

Japanese Patent Disclosure No. 54-3236 discloses an electrolyte body having a porous body prepared by using fine short fibers having a large specific surface area. However, the porous body fails to exhibit a sufficient mechanical strength because the fibers used are short. In addition, the particular porous body is inferior in its capability of retaining an electrolyte to the porous body made of fine retaining particles.

Further, each of Japanese Patent Disclosure Nos. 58-128670 and 58-129777 discloses an electrolyte body having a porous body prepared by using fine retaining particles and long fibers acting as a reinforcing material. However, the long fibers fail to be mixed uniformly with the fine retaining particles, making it difficult to control as desired the fine structure of the resultant porous body. As a result, large pores tend to be formed in the porous body in the initial stage of operation of the fuel cell comprising the particular electrolyte body. In this case, changes in the fine structure of the porous body are accelerated during operation of the fuel cell, leading to an outflow of the electrolyte impregnated in the porous body in a short time. Further, agglomeration and coalescence take place between the retaining particles and the long fibers forming the porous body during operation of the fuel cell, leading to formation of continuous pores along the long fiber. As a result, a gas crossover is brought about, leading to a shortened life of the fuel cell.

SUMMARY OF THE INVENTION

An object of the present invention is to provide a molten carbonate fuel cell having a long life time, 10 wherein the strength of an electrolyte body is improved and outflow of an electrolyte from an electrolyte body is reduced to prevent an increase in internal resistance of the electrolyte body and occurrence of a gas crossover.

Another object of the present invention is to provide a molten carbonate fuel cell having a long life time, wherein the stability and strength of an electrolyte body are improved during operation under a high tempera-ture and under a pressurized condition (high humidity condition) for obtaining an increased output, and outflow of an electrolyte from an electrolyte body is reduced to prevent an increase in internal resistance of the electrolyte body and occurrence of a gas crossover.

According to the present invention, there is provided a molten carbonate fuel cell, comprising:

a pair of conductive electrodes;

an electrolyte body sandwiched between the pair of electrodes and including a porous body containing a retaining material and a reinforcing material and an electrolyte impregnated in the porous body and containing an alkali carbonate mixture, the retaining material containing fine particles having an average particle diameter of 0.2 to 0.6 μm and the reinforcing material containing short fibers having an average diameter of 0.5 to 5 μm and an average length of at most 50 μm;

fuel gas supplying means for supplying a fuel gas to one of the pair of electrodes; and oxidant gas supplying means for supplying an oxidant gas to the other of the pair of electrodes.

According to the present invention, there is also provided a molten carbonate fuel cell, comprising:

a pair of conductive electrodes;

an electrolyte body sandwiched between the pair of electrodes and including a porous body containing a retaining material and a reinforcing material and an electrolyte impregnated in the porous body and containing an alkali carbonate mixture, the retaining material containing a mixture first fine particles of α-lithium aluminate having an average particle diameter of 0.2 to 0.6 μm and second fine particles, having an average particle diameter of 0.2 to 0.6 μm, of at least one material selected from the group consisting of lithium zirconate, stabilized zirconia, lithium tantalate, lithium niobate and lithium titanate, and the reinforcing material containing at least one short fiber selected from the group consisting of lithium aluminate, lithium zirconate, stabilized zirconia, lithium tantalate, lithium niobate and lithium titanate;

fuel gas supplying means for supplying a fuel gas to one of the pair of electrodes; and oxidant gas supplying means for supplying an oxidant gas to the other of the pair of electrodes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a perspective view showing a general structure of a molten carbonate fuel cell according to the present invention.

DETAILED DESCRIPTION OF THE PREFERRED EMBODIMENTS

Figure 1:
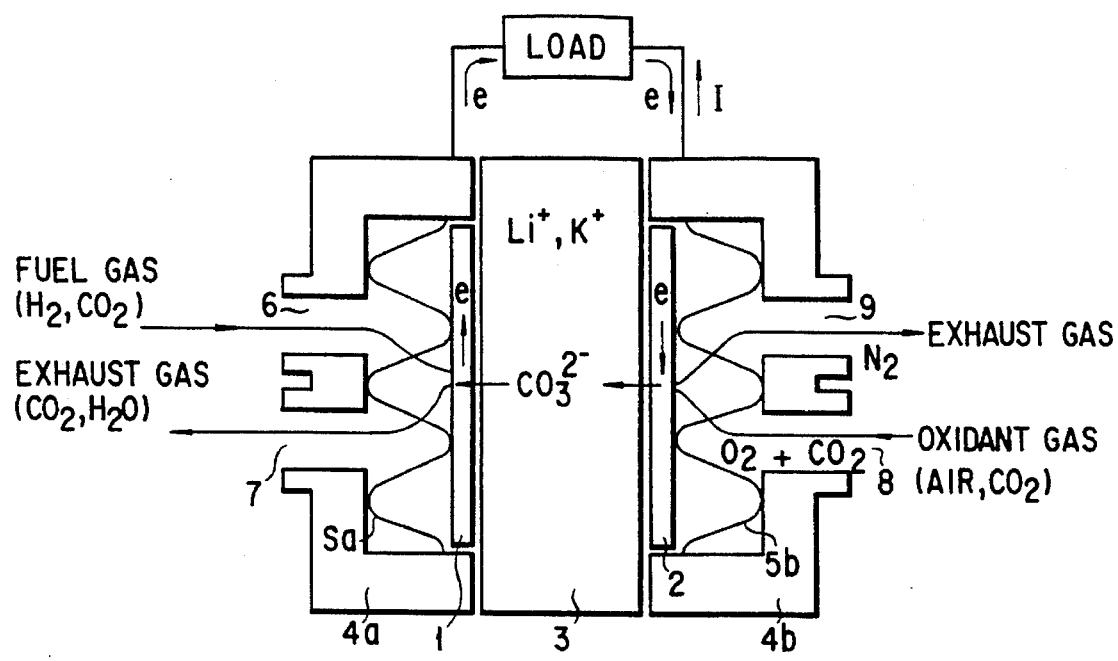
FIG. 1 is a schematic view showing a basic structure of a molten carbonate fuel cell.

A molten carbonate fuel cell according to the present invention will be described in detail with reference to FIGS. 2 and 3 below.

The molten carbonate fuel cell according to the present invention comprises an anode (fuel electrode) 11, a cathode (air electrode) 12, and an electrolyte body 13 sandwiched between the anode 11 and the cathode 12. The electrolyte body 13 retains an electrolyte. The anode 11, the cathode 12, and the electrolyte body 13 constitute a unit cell. A plurality of unit cells are stacked with separators 14 interposed therebetween. A pair of opposite edge portions of the anode 11 located on the upper surface of the electrolyte body 13 are located inward from the edge of the electrolyte body 13 by a predetermined distance. An edge seal plate 15a is located between the separator 14 and each edge portion of the electrolyte body 13 over which the anode 11 does not extend. A pair of edge portions, perpendicular to the edge seal plate 15a, of the cathode 12 located on the lower surface of the electrolyte body 13, are located inward from the edge portions of the electrolyte body 13 by a predetermined distance. An edge seal plate 15b is located between the separator 14 and each edge portion of the electrolyte body 13 over which the cathode 12 does not extend. A conductive perforated plate 16a serving as a collector and a corrugated plate 17a are sequentially stacked from the anode 11 in a space (i.e., a fuel gas flow space) defined by the anode 11, the separator 14, and the edge seal plate 15a. A conductive perforated plate 16b serving as a collector and a corrugated plate 17b are sequentially stacked from the cathode 12 in a space (i.e., an oxidant gas flow space) defined by the cathode 12, the separator 14, and the edge seal plate 15b. Manifolds 19 each having a frame-like flange 18 are located at four side surfaces of a stacked power generating assembly obtained by stacking a plurality of such unit cells, with the separators 14 interposed therebetween.

Four frame-like manifold seal plates 20 are interposed between the four side surfaces of the stacked power generating assembly and the four flanges 18 of the manifolds 19, respectively. A supply pipe 22 for supplying a fuel gas 21 is connected to the manifold (not shown) corresponding to the side surface of the power generating assembly to which the fuel gas flow space is exposed. A gas exhaust pipe 23 is connected to the manifold 19 at the position opposite to the supply pipe 22. A supply pipe 25 for supplying an oxidant gas 24 is connected to the manifold (not shown) corresponding to the side surface of the power generating assembly to which the oxidant gas flow space is exposed. A gas exhaust pipe 26 is connected to the manifold opposite to the supply pipe 25.

Each of the anode 11 and the cathode 12 is made of a nickel-based alloy or a porous sintered body of the nickel-based alloy.

The separators 14, the edge seal plates 15a and 15b, the perforated plates 16a and 16b, and the corrugated plates 17a and 17b are made of, for example, stainless steel.

A gas mixture of, for example, hydrogen ($H_2$) and carbon dioxide ($CO_2$) can be used as the fuel gas. A gas mixture of carbon dioxide ($CO_2$) and air or oxygen ($O_2$) can be used as the oxidant gas.

The electrolyte body 13 comprises a porous body A-1 or A-2 to be described in detail later and an electrolyte B impregnated in the porous body.

Porous Body A-1:

Porous body A-1 comprises a retaining material containing fine particles having an average particle diameter of 0.2 to 0.6 μm and a reinforcing material containing short fibers having an average diameter of 0.5 to 5 μm and an average length of at most 50 μm.

The fine particles constituting the retaining material are made of at least one material selected from the group consisting of, for example, lithium aluminate, lithium zirconate, stabilized zirconia, lithium tantalate, lithium niobate and lithium titanate.

The lithium aluminate noted above includes, for example, α-lithium aluminate, β-lithium aluminate and γ-lithium aluminate.

The lithium zirconate noted above includes lithium zirconate stabilized with MgO, $Y_2O_3$ or CaO. This stabilized lithium zirconate can be synthesized by causing zirconia or zirconia stabilized with MgO, $Y_2O_3$ or CaO to react with a lithium carbonate, nitrate or hydroxide.

The stabilized zirconia is stabilized with MgO, $Y_2O_3$ or CaO.

The lithium tantalate includes, for example, $LiTaO_3$, and $Li_3TaO_4$. The lithium niobate includes, for example, $LiNbO_2$, $LiNB_3O_8$, $Li_3NbO_4$ and $LiNbO_3$. Further, the lithium titanate includes, for example, $LiTiO_2$ and $Li2TiO_3$.

It is particularly desirable to use fine particles of α-lithium aluminate as the retaining material.

As already described, the fine particles constituting the retaining material should have an average particle diameter of 0.2 to 0.6 μm. If the average particle diameter is smaller than 0.2 μm, the fine particles are agglomerated to form larger particles within the molten electrolyte consisting of an alkali carbonate mixture, leading to a lowered structural stability of the porous body impregnated with the electrolyte. On the other hand, if the average particle diameter is larger than 0.6 μm, the porous body containing the fine particles fails to retain sufficiently the impregnated electrolyte. Preferably, the fine particles constituting the retaining material have an average particle diameter of 0.25 to 0.55 μm.

The particle size distribution is also important in the fine particles constituting the retaining material. Specifically, it is desirable that particles having particle diameters falling within ±60% of the average particle diameter occupy at least 80% by volume of the fine particles. For example, in the case of using fine particles having an average particle diameter of 0.4 μm, which falls within the range of between 0.2 μm and 0.6 μm specified in the present invention, it is desirable that particles having particle diameters falling within 0.4 μm ±60%, i.e., a range of between 0.16 μm and 0.64 μm, occupy at least 80% by volume of the fine particles.

The short fibers constituting the reinforcing material are also made of at least one material selected from the group consisting of lithium aluminate, lithium zirconate, stabilized zirconia, lithium tantalate, lithium niobate and lithium titanate, like the fine particles constituting the retaining material.

As described previously, the short fibers should have an average diameter of 0.5 to 5 μm and an average length of at most 50 μm. If the average diameter is smaller than 0.5 μm, the porous body containing the short fibers fails to exhibit a sufficiently high mechanical strength. On the other hand, if the average diameter is larger than 5 μm, the difference in curvature between the fine particles and the short fibers is increased. As a result, these fine particles and short fibers are agglomerated to form larger bodies within the molten electrolyte consisting of an alkali carbonate mixture, leading to a low structural stability of the porous body impregnated with the electrolyte. Preferably, the short fibers have an average diameter of 1 to 2 μm. Further, where the short fibers have an average length exceeding 50 μm, it is difficult to control the fine structure of the porous body. As a result, the fine particles constituting the retaining material and the short fibers are agglomerated to form larger bodies within the molten electrolyte consisting of an alkali carbonate mixture, leading to a low structural stability of the porous body impregnated with the electrolyte. Further, compared with long fibers of the same volume, short fibers can be dispersed without orientation in a porous body at a high density, making it possible to suppress efficiently the crack occurrence accompanying the molten electrolyte solidification in the process of temperature drop. Preferably, the short fibers have an average length of 5 to 30 μm. Also, the average length of the short fibers should desirably be at most ¼ of the thickness of the electrolyte body.

It is desirable for the retaining material and the reinforcing material to be made of different materials. Where each of these retaining material and reinforcing material is made of a mixture of different materials, the retaining material and the reinforcing material should be different from each other in composition of the mixture.

The mixing ratio by volume of the retaining material to the reinforcing material within the porous body preferably ranges between 5:5 and 9:1. If the mixing ratio by volume of the retaining material is lower than 5, the porous body containing the retaining material and the reinforcing material is likely to fail to retain sufficiently the molten electrolyte. On the other hand, if the mixing ratio by volume of the retaining material is higher than 9, the amount of the reinforcing material is too small to enable the porous body containing the retaining material and the reinforcing material to exhibit a sufficiently high mechanical strength. More preferably, the mixing ratio by volume of the retaining material to the reinforcing material is 6:4 to 8:2.

The porous body desirably has a porosity of 40 to 65%. Where the porosity falls within this range, the porous body permits retaining satisfactorily the molten carbonate electrolyte and is capable of maintaining a desired mechanical strength.

Further, it is possible for the porous body to contain at least one of particles having an average particle diameter of 5 to 50 μm and long fibers having an average length of at most 200 μm as a reinforcing material. These particles and/or long fibers are preferably contained in the porous body in an amount of at most 5% by volume.

Porous Body A-2:

Porous body A-2 comprises a retaining material and a reinforcing material. The retaining material contains a mixture of first particles of α-lithium aluminate having an average particle diameter of 0.2 to 0.6 μm and second fine particles having an average particle diameter of 0.2 to 0.6 μm. The second fine particles are made of at least one material selected from the group consisting of lithium zirconate, stabilized zirconia, lithium tantalate, lithium niobate and lithium titanate. On the other hand, the reinforcing material consists of short fibers made of at least one material selected from the group consisting of lithium aluminate, lithium zirconate, stabilized zirconia, lithium tantalate, lithium niobate and lithium titanate. These lithium zirconate, stabilized zirconia, lithium tantalate, lithium niobate and lithium titanate are equal to those described previously in conjunction with porous body A-1.

As described above, each of the first and second fine particles constituting the retaining material should have an average particle diameter of 0.2 to 0.6 μm. If the average particle diameter is less than 0.2 μm, the fine particles are agglomerated to form larger particles within the molten electrolyte consisting of an alkali carbonate mixture, leading to a lowered structural stability of the porous body impregnated with the electrolyte. On the other hand, if the average particle diameter is larger than 0.6 μm, the porous body containing the fine particles fails to retain sufficiently the impregnated electrolyte. Preferably, the fine particles constituting the retaining material have an average particle diameter of 0.25 to 0.55 μm.

The mixing ratio by volume of the first fine particles to the second fine particles is preferably be 5:5 to 9:1. If the mixing ratio by volume of the first fine particles is less than 5, it is difficult to obtain a porous body which is stable during operation of the fuel cell under a high temperature and a pressurized condition for obtaining an increased output. On the other hand, if the mixing ratio by volume of the first fine particles is more than 9, the amount of the second fine particles consisting of, for example, lithium zirconate is so small as to cause the retaining material consisting of the first fine particles to be agglomerated to form larger particles during operation of the fuel cell under a high temperature and a pressurized condition, with the result that the retaining material fails to retain sufficiently the molten carbonate electrolyte. More preferably, the mixing ratio by volume of the first fine particles to the second fine particles falls within a range of between 6:4 and 8:2.

The short fibers constituting the reinforcing material preferably have an average diameter of 0.5 to 10 μm and an average length of 50 μm or less. If the average diameter of the short fibers is less than 0.5 μm, the porous body containing the short fibers tends to fail to exhibit a sufficiently high mechanical strength. On the other hand, if the average diameter is larger than 5 μm, the difference in curvature between the fine particles constituting the retaining material and the short fibers is increased. As a result, these fine particles and short fibers are agglomerated to form larger bodies within the molten electrolyte consisting of an alkali carbonate mixture, leading to a low structural stability of the porous body impregnated with the electrolyte. Preferably, the short fibers have an average diameter of 1 to 2 μm. Further, where the short fibers have an average length exceeding 50 μm, it is difficult to control the fine structure of the porous body. As a result, the fine particles and the short fibers are agglomerated to form larger bodies within the molten carbonate electrolyte, leading to a low structural stability of the porous body impregnated with the electrolyte. Preferably, the short fibers have an average length of 5 to 30 μm.

The retaining material and the reinforcing material are preferably formed of different materials.

Porous bodies exemplified below can be used satisfactorily in the molten carbonate fuel cell of the present invention:

(a) A porous body comprising of a retaining material and a reinforcing material, the retaining material containing a mixture of first fine particles of α-lithium aluminate and second fine particles of lithium zirconate, and the reinforcing material containing short fibers of α-, β- or γ-lithium aluminate.

(b) A porous body comprising a retaining material and a reinforcing material, the retaining material containing a mixture of first fine particles of α-lithium aluminate and second fine particles of lithium tantalate, and the reinforcing material containing short fibers of lithium zirconate.

The mixing ratio by volume of the retaining material to the reinforcing material within the porous body freferably ranges between 5:5 and 9:1. If the mixing ratio by volume of the retaining material is lower than 5, the porous body containing the retaining material and the reinforcing material is likely to fail to retain sufficiently the molten carbonate electrolyte. On the other hand, if the mixing ratio by volume of the retaining material is higher than 9, the amount of the reinforcing material is too small to enable the porous body containing the retaining material and the reinforcing material to exhibit a sufficiently high mechanical strength. More preferably, the mixing ratio by volume of the retaining material to the reinforcing material is 6:4 to 8:2.

The porous body desirably has a porosity of 40 to 65%. where the porosity falls within this range, the porous body permits retaining satisfactorily the molten carbonate electrolyte and is capable of maintaining a desired mechanical strength.

Further, it is possible for the porous body to contain at least one of particles having an average particle diameter of 5 to 50 μm and long fibers having an average length of at most 200 μm as a reinforcing material. These particles and/or long fibers are desirably contained in the porous body in an amount of at most 5% by volume.

Electrolyte B:

The alkali carbonate mixture used as the electrolyte in the fuel cell of the present invention includes, for example, a mixture of lithium carbonate ($Li_2CO_3$) and potassium carbonate ($K_2CO_3$), a mixture of $Li_2CO_3$ and sodium carbonate ($Na_2CO_3$), and a mixture of $Li_2CO_3$, $K_2CO_3$, and $Na_2CO_3$. It is possible for the electrolyte to contain an additional component of at least one carbonate of an alkaline earth element selected from the group consisting of calcium carbonate, magnesium carbonate and barium carbonate.

The electrolyte body included in the fuel cell of the present invention can be prepared, for example, as follows:

(1) In the first step, an organic binder is added to a mixture including the retaining material and the reinforcing material, and the resultant mixture is stirred in the presence of an organic solvent. The organic binder noted above includes, for example, polyvinyl butyral, a plasticizer, and an acrylic resin. On the other hand, the organic solvent includes, for example, toluene, xylene, and methyl ethyl ketone. Then, the mixture is formed into a green sheet by the ordinary sheet-forming method such as a doctor blade method, followed by burning-out the green sheet to obtain a porous body having a predetermined porosity.

On the other hand, an electrolyte containing an alkali carbonate mixture is similarly formed into a sheet. Further, the electrolyte sheet is superposed on the porous body, followed by melting the electrolyte sheet to cause the molten carbonate electrolyte to be impregnated in the porous body, thereby obtaining a desired electrolyte body.

(2) The porous body prepared by the method of item (1) above is disposed between an anode impregnated in advance with an alkali carbonate mixture and a cathode which is not impregnated to form a unit cell as shown in FIG. 2. A plurality of unit cells thus formed are stacked one upon the other with separators interposed therebetween to form a stacked power generating element, followed by mounting a manifold to each of the four side surfaces of the resultant power generating element so as to assemble a fuel cell. The fuel cell is then heated to an operating temperature to cause the molten alkali carbonate mixture within the anode to be diffused and loaded in the pores of the porous body, thereby obtaining a desired electrolyte body. The thickness of the electrolyte body should desirably be 200 μm to 600 μm. It is difficult to obtain an electrolyte body of a uniform thickness, if the thickness of the electrolyte body is unduly large. If the thickness is unduly small, however, it is difficult to obtain a desired effect of the present invention.

As described above, the molten carbonate fuel cell of the present invention comprises an electrolyte body including a porous body A-1 and an alkali carbonate mixture acting as an electrolyte. The porous body A-1 comprises a retaining material containing fine particles having an average particle diameter of 0.2 to 0.6 µm and a reinforcing material containing of short fibers having an average diameter of 0.5 to 5 µm and an average length of at most 50 µm. The electrolyte noted above is impregnated in the porous body to form the electrolyte body. The porous body included in the electrolyte body exhibits a high mechanical strength and is capable of retaining the electrolyte stably over a long period of time. As a result, an outflow of the electrolyte from the electrolyte body can be lowered so as to suppress an increase in the internal resistance and occurrence of a gas crossover accompanying the outflow of the electrolyte. It follows that the molten carbonate fuel cell of the present invention comprising the particular electrolyte body exhibits a long life.

To reiterate, fine particles having a predetermined average particle diameter are used as a retaining material so as to suppress agglomeration of the fine particles to form larger particles, making it possible to form a porous body of fine structure. As a result, the electrolyte containing an alkali carbonate mixture can be retained in the porous body satisfactorily. Also, short fibers having a predetermined average diameter and a predetermined length are used as a reinforcing material so as to improve the mechanical strength of the porous body. In addition, the fine structure of the porous body can be controlled easily. what should also be noted is that the difference in curvature between the short fibers constituting the reinforcing material and the fine particles constituting the retaining material can be made smaller than that between a reinforcing material made of particles of a larger diameter, which exhibit the same reinforcing effect, and the fine particles constituting the retaining material, 10 making it possible to prevent the fine particles and the short fibers from being agglomerated to form larger particles within the molten electrolyte of an alkali carbonate mixture. As a result, the porous body impregnated with the electrolyte permits maintaining a satisfactory structural stability and, thus, is capable of retaining the electrolyte over a long period of time. In addition, the porous body has the resistance to heat cycles over a long period of time.

As pointed out above, the molten carbonate fuel cell of the present invention comprising the particular electrolyte body permits decreasing the outflow of the electrolyte from the electrolyte body. Naturally, it is possible to suppress an increase of the internal resistance and occurrence of a gas crossover accompanying the outflow of the electrolyte, leading to a long life time of the fuel cell.

Further, the retaining material containing the fine particles and the reinforcing material containing the short fibers are made of different materials. This makes it possible to prevent more effectively the fine particles and the short fibers from being agglomerated to form larger particles within the molten electrolyte containing an alkali carbonate mixture. As a result, the molten carbonate fuel cell of the present invention comprising the electrolyte body prepared by impregnating a porous body including the retaining material and the reinforcing material with the electrolyte permits decreasing the outflow of the electrolyte from the electrolyte body. Naturally, it is possible to suppress an increase of the internal resistance and occurrence of a gas crossover accompanying the outflow of the electrolyte, leading to a long life time of the fuel cell.

The present invention also provides a molten carbonate fuel cell comprising an electrolyte body including the porous body A-2 described previously and a molten electrolyte of an alkali carbonate mixture impregnated in the porous body A-2. As described previously, the porous body A-2 comprises a retaining material containing a mixture of the first and second fine particles and a reinforcing material. The first fine particles have an average particle diameter of 0.2 to 0.6 µm and are made of $\alpha$-lithium aluminate. The second fine particles also have an average particle diameter of 0.2 to 0.6 µm and are made of at least one material selected from the group consisting of lithium zirconate, stabilized zirconia, lithium tantalate, lithium niobate and lithium titanate. Further, the reinforcing material contains short fibers of at least one material selected from the group consisting of lithium aluminate, lithium zirconate, stabilized zirconia, lithium tantalate, lithium niobate and lithium titanate. The porous body included in the particular electrolyte body exhibits a good structure stability during operation of the fuel cell under a high temperature and a pressurized condition (humidified condition) for increasing the cell output, with the result that the electrolyte can be retained satisfactorily over a long period of time. As a result, the outflow of the electrolyte from the electrolyte body can be decreased during the operation of the fuel cell under a high temperature and a pressurized condition. It follows that an increase of the internal resistance and occurrence of a gas crossover accompanying the outflow of the electrolyte can be suppressed. As a result, the molten carbonate fuel cell of the present invention comprising the particular electrolyte body is enabled to perform a high output operation and to exhibit a long life time.

The present inventors have conducted an extensive research on the lithium aluminate generally used as a retaining material. It has been found that $\alpha$-lithium aluminate is unlikely to be transformed within the molten electrolyte of an alkali carbonate mixture, especially under a humidified condition, compared with the generally used $\gamma$-lithium aluminate. In other words, $\alpha$-lithium aluminate has been found to exhibit a good phase stability and to be unlikely to be agglomerated to form larger particles. However, where the electrolyte body is prepared by impregnating a porous body including fine particles of $\alpha$-lithium aluminate alone as a retaining material with an electrolyte containing a molten alkali carbonate mixture, a difficulty is brought about in the case of operating the fuel cell comprising the particular electrolyte body under a high temperature and a pressurized condition (humidified condition) for increasing the cell output. Specifically, even the fine particles of $\alpha$-lithium aluminate having a high phase stability are likely to be agglomerated to form larger particles under such severe operating conditions. As a result, the fine structure of the porous body is collapsed so as to cause the porous body to fail to retain the electrolyte satisfactorily.

To overcome the difficulty described above, a mixture of first fine particles and second fine particles differing from the first fine particles in the material is used as the retaining material in one embodiment of the present invention. To be more specific, the fine particles of $\alpha$-lithium aluminate, i.e., the first fine particles, are used in combination with the second fine particles of at least one material selected from the group consisting of lithium zirconate, stabilized zirconia, lithium tantalate, lithium niobate and lithium titanate. In this case, the second fine particles are interposed between the first fine particles, with the result that the first fine particles of $\alpha$-lithium aluminate are prevented from being mutually agglomerated to form larger particles. Likewise, the second fine particles are also prevented from being mutually agglomerated to form larger particles. It should also be noted that the second fine particles of lithium zirconate, stabilized zirconia, lithium tantalate, lithium niobate or lithium titanate have a density higher than that of the first fine particles of α-lithium aluminate. In other words, the second fine particles are unlikely to be migrated within the molten electrolyte of an alkali carbonate mixture, making it possible to prevent more effectively the first and second fine particles from being agglomerated. Further, the first and second fine particles are each defined to have an average particle diameter of 0.2 to 0.6 μm in the present invention. As a result, the first fine particles are more effectively prevented from being agglomerated to form larger particles. Likewise, the second fine particles are also prevented more effectively from being agglomerated to form larger particles. It follows that the porous body including both first and second fine particles is enabled to retain its fine structure satisfactorily, with the result that the electrolyte can be retained satisfactorily even if the fuel cell is operated under a high temperature and a humidified condition.

α-lithium aluminate particles having an average particle diameter of 0.2 to 0.6 μm of the present invention can be prepared, for example, as follows:

In the first step, α-lithium aluminate particles having a high surface area are mixed with carbonate powder. Then, the mixture is heated for about 100 hr at 700°–800° C. in a $CO_2$ environment, followed by cooling and removing carbonate from α-lithium aluminate particles by washing with water or organic acid.

Also, short fibers of a predetermined material are used as a reinforcing material so as to improve the mechanical strength of the porous body, making it possible to prevent the electrolyte body prepared by impregnating the porous body with a molten electrolyte of an alkali carbonate mixture from being cracked when a fuel cell comprising the particular electrolyte body is subjected to heat cycles. What should also be noted is that the difference in curvature between the short fibers constituting the reinforcing material and the first and second fine particles constituting the retaining material can be made smaller than that between a reinforcing material made of particles of a larger diameter, which exhibit the same reinforcing effect, and the first and second fine particles constituting the retaining material, making it possible to prevent the first and second fine particles and the short fibers from being agglomerated to form larger particles within the molten electrolyte of an alkali carbonate mixture. As a result, the porous body impregnated with the electrolyte permits maintaining a satisfactory structural stability and, thus, is capable of retaining the electrolyte over a long period of time. In addition, the porous body has the resistance to heat cycles over a long period of time.

As pointed out above, the molten carbonate fuel cell of the present invention comprising the particular electrolyte body permits decreasing the outflow of the electrolyte from the electrolyte body when the fuel cell is operated under a high temperature and a pressurized condition for increasing output. Naturally, it is possible to suppress an increase of the internal resistance and occurrence of a gas crossover accompanying the outflow of the electrolyte, leading to a long life time of the fuel cell.

Particularly, short fibers having an average diameter of 0.5 to 5 μm and an average length of at most 50 μm are used as a reinforcing material in the present invention. In the case of using such short fibers, the fine structure of the porous body can be controlled easily so as to suppress agglomeration and coalescence between the fine particles used as the retaining material and the short fibers. It follows that the electrolyte impregnated in the porous body can be retained more effectively. Further, since the short fibers are dispersed without orientation, the resistance to heat cycles can be further improved.

The present invention will be described in greater detail below by way of its preferred examples.

EXAMPLE 1

In the first step, a retaining material consisting of fine particles of α-lithium aluminate ($LiAlO_2$) having an average particle diameter of 0.4 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm, i.e., particle diameters falling within a range of between 0.16 μm and 0.64 μm, were found to occupy at least 80% by volume of the fine particles of the retaining material. The slurry was developed on a carrier sheet to prepare a matrix green sheet having a thickness of about 0.5 mm, followed by burning-out the green sheet under the air atmosphere so as to obtain a porous body.

Then, an alkali carbonate mixture consisting of 62 mol % of $Li_2CO_3$ and 38 mol % of $K_2CO_3$ was put in an alumina pot together with polyvinyl butyral, dibutyl phthalate and toluene. These materials were subjected to a wet mixing to prepare a slurry, followed by developing the slurry on a carrier sheet to obtain a green sheet. Further, the green sheet was burned-out to obtain a sheet-like material containing the alkali carbonate mixture as an electrolyte. The sheet-like material was superposed on the porous body, followed by heating to 550° C. to melt the sheet-like material, thereby obtaining an electrolyte body having a thickness of 0.5 mm, in which the molten alkali carbonate mixture was impregnated in the porous body.

EXAMPLE 2

In the first step, a retaining material consisting of fine particles of α-lithium aluminate ($LiAlO_2$) having an average particle diameter of 0.4 μm and a reinforcing material consisting of short fibers of γ-lithium aluminate having an average diameter of 0.5 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 3

In the first step, a retaining material consisting of fine particles of α-lithium aluminate ($LiAlO_2$) having an average particle diameter of 0.4 μm and a reinforcing material consisting of short fibers of γ-lithium aluminate having an average diameter of 5 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 4

In the first step, a retaining material consisting of fine particles of α-lithium aluminate ($LiAlO_2$) having an average particle diameter of 0.4 μm and a reinforcing material consisting of short fibers of γ-lithium aluminate having an average diameter of 2 μm and an average length of 50 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 5

In the first step, a retaining material consisting of fine particles of α-lithium aluminate ($LiAlO_2$) having an average particle diameter of 0.2 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.2 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 6

In the first step, a retaining material consisting of fine particles of α-lithium aluminate ($LiAlO_2$) having an average particle diameter of 0.6 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.6 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 7

In the first step, a retaining material consisting of fine particles of γ-lithium aluminate ($LiAlO_2$) having an average particle diameter of 0.4 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 8

In the first step, a retaining material consisting of fine particles of lithium titanate ($LiTiO_2$) having an average particle diameter of 0.4 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 9

In the first step, a retaining material consisting of fine particles of lithium zirconate ($Li_2ZrO_3$) having an average particle diameter of 0.4 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 10

In the first step, a retaining material consisting of fine particles of lithium niobate ($LiNbO_3$) having an average particle diameter of 0.4 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 11

In the first step, a retaining material consisting of fine particles of lithium tantalate ($LiTaO_3$) having an average particle diameter of 0.4 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 12

In the first step, a retaining material consisting of a mixture of fine particles of γ-lithium aluminate having an average particle diameter of 0.4 μm and fine particles of lithium zirconate having the same average particle diameter and particle size distribution as the fine particles of the γ-lithium aluminate and a reinforcing material consisting of short fibers of γ-lithium aluminate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. The particles having particle diameters falling within ±60% of the average particle diameter of 0.4 μm were found to occupy at least 80% by volume of the fine particles of γ-lithium aluminate used as one component of the retaining material. Also, the fine particles of γ-lithium aluminate and the fine particles of lithium zirconate were mixed at a mixing ratio by volume of 70:30 to prepare the retaining material.

Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 13

In the first step, a retaining material consisting of a mixture of fine particles of γ-lithium aluminate having an average particle diameter of 0.4 μm and fine particles of lithium tantalate having the same average particle diameter and particle size distribution as the fine particles of the γ-lithium aluminate and a reinforcing material consisting of short fibers of γ-lithium aluminate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. The particles having particle diameters falling within ±60% of the average particle diameter of 0.4 μm were found to occupy at least 80% by volume of the fine particles of γ-lithium aluminate used as one component of the retaining material. Also, the fine particles of γ-lithium aluminate and the fine particles of lithium tantalate were mixed at a mixing ratio by volume of 70:30 to prepare the retaining material.

Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 14

In the first step, a retaining material consisting of a mixture of fine particles of γ-lithium aluminate having an average particle diameter of 0.4 μm and fine particles of lithium zirconate having the same average particle diameter and particle size distribution as the fine particles of the γ-lithium aluminate and a reinforcing material consisting of short fibers of lithium zirconate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. The particles having particle diameters falling within ±60% of the average particle diameter of 0.4 μm were found to occupy at least 80% by volume of the fine particles of γ-lithium aluminate used as one component of the retaining material. Also, the fine particles of γ-lithium aluminate and the fine particles of lithium zirconate were mixed at a mixing ratio by volume of 70:30 to prepare the retaining material.

Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 15

In the first step, a retaining material consisting of a mixture of fine particles of γ-lithium aluminate having an average particle diameter of 0.4 μm and fine particles of lithium tantalate having the same average particle diameter and particle size distribution as the fine particles of the γ-lithium aluminate and a reinforcing material consisting of short fibers of lithium zirconate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. The particles having particle diameters falling within ±60% of the average particle diameter of 0.4 μm were found to occupy at least 80% by volume of the fine particles of γ-lithium aluminate used as one component of the retaining material. Also, the fine particles of γ-lithium aluminate and the fine particles of lithium tantalate were mixed at a mixing ratio by volume of 70:30 to prepare the retaining material.

Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 16

In the first step, a retaining material consisting of fine particles of α-lithium aluminate having an average particle diameter of 0.4 μm and a reinforcing material consisting of short fibers of lithium zirconate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

EXAMPLE 17

In the first step, a retaining material consisting of fine particles of α-lithium aluminate having an average particle diameter of 0.4 μm and a reinforcing material consisting of short fibers of lithium zirconate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 50% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 1

In the first step, fine particles of α-lithium aluminate ($LiAlO_2$) having an average particle diameter of 0.4 μm were put in an alumina pot together with polyvinyl butyral, dibutyl phthalate and toluene, and subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 2

In the first step, a retaining material consisting of fine particles of α-lithium aluminate having an average particle diameter of 0.4 μm and a reinforcing material consisting of particles of γ-lithium aluminate having an average diameter of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 3

In the first step, a retaining material consisting of fine particles of α-lithium aluminate having an average particle diameter of 0.4 μm and a reinforcing material consisting of short fibers of γ-lithium aluminate having an average diameter of 0.3 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 4

In the first step, a retaining material consisting of fine particles of α-lithium aluminate having an average particle diameter of 0.4 μm and a reinforcing material consisting of short fibers of γ-lithium aluminate having an average diameter of 8 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 5

In the first step, a retaining material consisting of fine particles of α-lithium aluminate having an average particle diameter of 0.4 μm and a reinforcing material consisting of short fibers of γ-lithium aluminate having an average diameter of 2 μm and an average length of 70 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 6

In the first step, a retaining material consisting of fine particles of α-lithium aluminate having an average particle diameter of 0.1 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.1 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 7

In the first step, a retaining material consisting of fine particles of α-lithium aluminate having an average particle diameter of 0.8 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.8 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 8

In the first step, a retaining material consisting of fine particles of α-lithium aluminate having an average particle diameter of 0.4 μm and a reinforcing material consisting of short fibers of alumina ($Al_2O_3$) having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. The particles having particle diameters falling within ±60% of the average particle diameter of 0.4 μm were found to occupy at least 80% by volume of the fine particles of the retaining material. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 9

In the first step, short fibers of γ-lithium aluminate having an average diameter of 0.2 μm and an average length of 1 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 10

In the first step, long fibers of γ-lithium aluminate having an average diameter of 2 μm and an average length of 300 μm were put in an alumina pot together with polyvinyl butyral, dibutyl phthalate and toluene, and subjected to a wet mixing within the alumina pot for 20 hours so as to prepare a slurry. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 11

In the first step, long fibers of lithium zirconate having an average diameter of 2 μm and an average length of 300 μm were put in an alumina pot together with polyvinyl butyral, dibutyl phthalate and toluene, and subjected to a wet mixing within the alumina pot for 20 hours so as to prepare a slurry. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 12

In the first step, a retaining material consisting of fine particles of γ-lithium aluminate having an average particle diameter of 0.4 μm and a reinforcing material consisting of long fibers of γ-lithium aluminate having an average diameter of 2 μm and an average length of 300 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 13

In the first step, a retaining material consisting of fine particles of γ-lithium aluminate having an average particle diameter of 0.1 μm and a reinforcing material consisting of long fibers of alumina having an average diameter of 10 μm and an average length of 400 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 14

In the first step, fine particles of α-lithium aluminate having an average particle diameter of 0.1 μm were put in an alumina pot together with polyvinyl butyral, dibutyl phthalate and toluene, and subjected to a wet mixing within the alumina pot for 20 hours so as to prepare a slurry. Then, a porous body was prepared as in Example 1 by using the slurry, followed by impregnating the porous body with an alkali carbonate mixture equal to that used in Example 1 so as to obtain an electrolyte body having a thickness of 0.5 mm.

Comparative Example 15

In the first step, a retaining material consisting of fine particles of γ-lithium aluminate having an average particle diameter of 0.1 μm and a reinforcing material consisting of short fibers of lithium zirconate having an average diameter of 10 μm and an average length of 70 μm were put in an alumina pot in a volume ratio of 70:30 together with polyvinyl butyral, dibutyl phthalate and toluene, and these materials were subjected to a wet mixing within the alumina pot for 20 hours so as to prepare a slurry. Then, a porous body was prepared as in Example 1 by using the slurry, followed by impregnating the porous body with an alkali carbonate mixture equal to that used in Example 1 so as to obtain an electrolyte body having a thickness of 0.5 mm.

Figure 3:
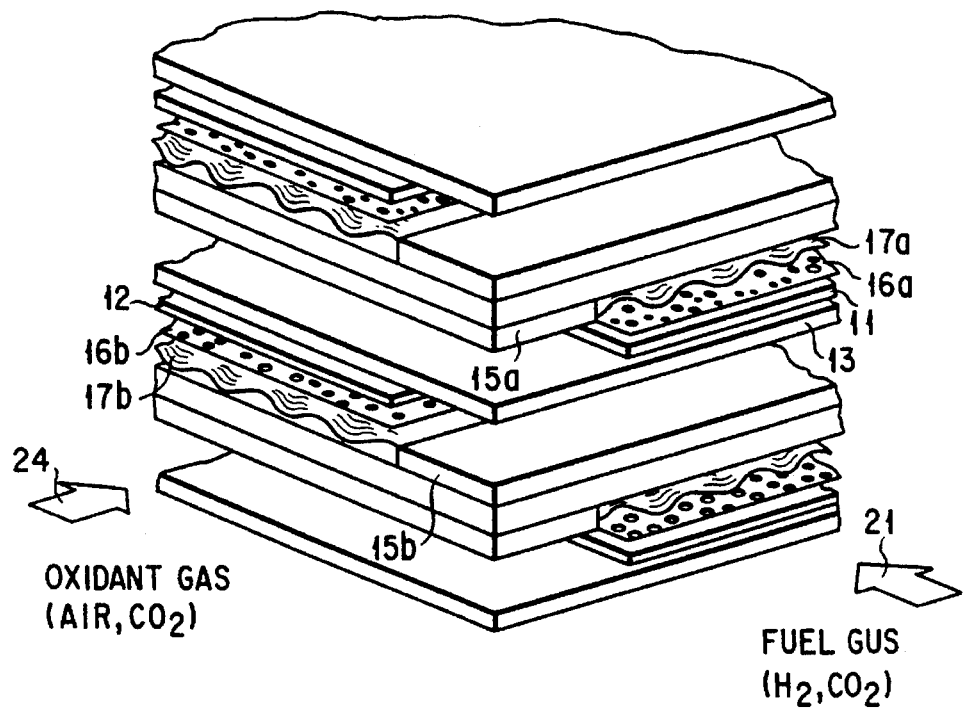
FIG. 3 is an exploded perspective view of a main part in FIG. 2.

A molten carbonate fuel cell constructed as shown in FIGS. 2 and 3 was prepared by using the electrolyte body prepared in each of Examples 1 to 17 and Comparative Examples 1 to 15, an anode made of a nickel-based alloy, a cathode made of a nickel-based alloy, a separator made of a stainless steel, an edge plate made of a stainless steel, and a corrugated plate made of a stainless steel. The fuel cell thus prepared was subjected to a power generating test at 700° C. with a load condition of 150 mA/cm$^2$ by supplying a fuel gas consisting of 80% by volume of a hydrogen gas ($H_2$) and 20% by volume of a carbon dioxide gas ($CO_2$) to the anode and an oxidant gas consisting of 70% by volume of air and 30% by volume of $CO_2$ gas to the cathode. The power generating test was continuously performed for 2,000 hours, with a heat cycle applied 5 times during the test. After the power generating test performed for 2,000 hours, a helium gas (He) was added in an amount of 10% by volume to the fuel gas supplied to the anode consisting of 80% by volume of $H_2$ gas and 20% by volume of $CO_2$ gas, while supplying the oxidant gas consisting of 70% by volume of air and 30% by volume of $CO_2$ to the cathode. Under this condition, a gas cross-leak amount was obtained by measuring the He concentration of the exhaust gas from the cathode. Table 1 shows the results.

TABLE I

| | Retaining Material (fine particles) | | Reinforcing Material | | | |
| --- | --- | --- | --- | --- | --- | --- |
| | | | | Fiber | | Gas |
| | Kind | Average Particle Diameter (μm) | Kind | Average Diameter (μm) | Average Length (μm) | Crossleak Amount (%) |
| Example 1 | α-LiAlO$_2$ | 0.4 | γ-LiAlO$_2$ | 2 | 30 | 0.8 |
| Example 2 | α-LiAlO$_2$ | 0.4 | γ-LiAlO$_2$ | 0.5 | 30 | 1.0 |
| Example 3 | α-LiAlO$_2$ | 0.4 | γ-LiAlO$_2$ | 5 | 30 | 1.0 |
| Example 4 | α-LiAlO$_2$ | 0.4 | γ-LiAlO$_2$ | 2 | 50 | 0.9 |
| Example 5 | α-LiAlO$_2$ | 0.2 | γ-LiAlO$_2$ | 2 | 30 | 0.9 |
| Example 6 | α-LiAlO$_2$ | 0.6 | γ-LiAlO$_2$ | 2 | 30 | 1.0 |
| Example 7 | γ-LiAlO$_2$ | 0.4 | γ-LiAlO$_2$ | 2 | 30 | 0.9 |
| Example 8 | LiTiO$_2$ | 0.4 | γ-LiAlO$_2$ | 2 | 30 | 0.5 |
| Example 9 | Li$_2$ZrO$_3$ | 0.4 | γ-LiAlO$_2$ | 2 | 30 | 0.4 |
| Example 10 | LiNbO$_3$ | 0.4 | γ-LiAlO$_2$ | 2 | 30 | 0.5 |
| Example 11 | LiTaO$_3$ | 0.4 | γ-LiAlO$_2$ | 2 | 30 | 0.4 |
| Example 12 | γ-LiAlO$_2$ + Li$_2$ZrO$_3$ | 0.4 | γ-LiAlO$_2$ | 2 | 30 | 0.3 |
| Example 13 | γ-LiAlO$_2$ + LiTaO$_3$ | 0.4 | γ-LiAlO$_2$ | 2 | 30 | 0.3 |
| Example 14 | γ-LiAlO$_2$ + Li$_2$ZrO$_3$ | 0.4 | Li$_2$ZrO$_3$ | 2 | 30 | 0.2 |
| Example 15 | γ-LiAlO$_2$ + LiTaO$_3$ | 0.4 | Li$_2$ZrO$_3$ | 2 | 30 | 0.1 |
| Example 16 | α-LiAlO$_2$ | 0.4 | Li$_2$ZrO$_3$ | 2 | 30 | 0.5 |
| Example 17 | α-LiAlO$_2$ | 0.4 | Li$_2$ZrO$_3$ | 2 | 30 | 1.0 |
| Comparative example 1 | α-LiAlO$_2$ | 0.4 | — | — | — | 4.9 |
| Comparative example 2 | α-LiAlO$_2$ | 0.4 | γ-LiAlO$_2$ (Large particles having average particle diameter of 30 μm) | | | 3.1 |
| Comparative example 3 | α-LiAlO$_2$ | 0.4 | γ-LiAlO$_2$ | 0.3 | 30 | 2.6 |
| Comparative example 4 | α-LiAlO$_2$ | 0.4 | γ-LiAlO$_2$ | 8 | 30 | 2.7 |
| Comparative example 5 | α-LiAlO$_2$ | 0.4 | γ-LiAlO$_2$ | 2 | 70 | 2.2 |
| Comparative | α-LiAlO$_2$ | 0.1 | γ-LiAlO$_2$ | 2 | 30 | 2.9 |

TABLE I-continued

| | Retaining Material (fine particles) | | Reinforcing Material | | | Gas |
|---|---|---|---|---|---|---|
| | Kind | Average Particle Diameter (μm) | Kind | Fiber Average Diameter (μm) | Fiber Average Length (μm) | Crossleak Amount (%) |
| example 6 | | | | | | |
| Comparative example 7 | α-LiAlO₂ | 0.8 | γ-LiAlO₂ | 2 | 30 | 4.2 |
| Comparative example 8 | α-LiAlO₂ | 0.4 | Al₂O₃ | 2 | 30 | 3.5 |
| Comparative example 9 | — | — | γ-LiAlO₂ | 0.2 | 1 | 4.6 |
| Comparative example 10 | — | — | γ-LiAlO₂ | 2 | 300 | 5.8 |
| Comparative example 11 | — | — | Li₂ZrO₃ | 2 | 300 | 5.7 |
| Comparative example 12 | γ-LiAlO₂ | 0.4 | γ-LiAlO₂ | 2 | 300 | 2.8 |
| Comparative example 13 | γ-LiAlO₂ | 0.1 | Al₂O₃ | 10 | 400 | 3.9 |
| Comparative example 14 | α-LiAlO₂ | 0.1 | — | — | — | 5.1 |
| Comparative example 15 | γ-LiAlO₂ | 0.1 | Li₂ZrO₃ | 10 | 70 | 2.6 |

The electrolyte body prepared in each of Examples 1 to 17 included a porous body containing a retaining material consisting of fine particles having an average particle diameter of 0.2 to 0.6 μm and a reinforcing material consisting of short fibers having an average diameter of 0.5 to 5 μm and an average length of at most 50 μm, each of said retaining material and reinforcing material being made of at least one material selected from the group consisting of lithium aluminate, lithium zirconate, stabilized zirconia, lithium tantalate, lithium niobate and lithium titanate. As apparent from Table 1, the gas cross-leak amount after operation for 2,000 hours, during which a heat cycle was applied 5 times, of the fuel cell comprising the electrolyte body prepared in any of Examples 1 to 17 was not larger than 1% relative to the cathode gas flow rate on the outlet side. This clearly supports that the molten carbonate fuel cell of the present invention exhibits a long life time and a high reliability.

On the other hand, the gas cross-leak amount after operation for 2,000 hours, during which a heat cycle was applied 5 times, of the fuel cell comprising the electrolyte body prepared in any of Comparative Examples 1 to 15 was larger than 2% relative to the cathode gas flow rate on the outlet side. This clearly supports that a severe gas crossover takes place in the fuel cell comprising an electrolyte body failing to meet the requirements specified in the present invention.

EXAMPLE 18

In the first step, a retaining material consisting of a mixture of first fine particles of α-lithium aluminate having an average particle diameter of 0.2 μm and second fine particles of lithium tantalate ($LiTaO_3$) having the same average particle diameter as the first fine particles and a reinforcing material consisting of short fibers of γ-lithium aluminate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30. The slurry was developed on a carrier sheet to prepare a matrix green sheet having a thickness of about 0.5 mm, followed by burning-out the green sheet under the air atmosphere so as to obtain a porous body.

Then, an alkali carbonate mixture consisting of 62 mol % of $Li_2CO_3$ and 38 mol % of $K_2CO_3$ was put in an alumina pot together with polyvinyl butyral, dibutyl phthalate and toluene. These materials were subjected to a wet mixing to prepare a slurry, followed by developing the slurry on a carrier sheet to obtain a green sheet. Further, the green sheet was burned-out to obtain a sheet-like material containing the alkali carbonate mixture as an electrolyte. The sheet-like material was superposed on the porous body, followed by heating to 550° C. to melt the sheet-like material, thereby obtaining an electrolyte body having a thickness of 0.5 mm, in which the molten alkali carbonate mixture was impregnated in the porous body.

EXAMPLE 19

In the first step, a retaining material consisting of a mixture of first fine particles of α-lithium aluminate having an average particle diameter of 0.6 μm and second fine particles of lithium tantalate having the same average particle diameter as the first fine particles and a reinforcing material consisting of short fibers of γ-lithium aluminate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30.

Then, a porous body was prepared as in Example 18 by using the slurry, followed by impregnating the porous body with an alkali carbonate mixture equal to that used in Example 18 so as to obtain an electrolyte body having a thickness of 0.5 mm.

EXAMPLE 20

In the first step, a retaining material consisting of a mixture of first fine particles of α-lithium aluminate having an average particle diameter of 0.4 μm and second fine particles of lithium titanate ($LiTiO_2$) having the same average particle diameter as the first fine particles and a reinforcing material consisting of short fibers of γ-lithium aluminate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30.

Then, a porous body was prepared as in Example 18 by using the slurry, followed by impregnating the porous body with an alkali carbonate mixture equal to that used in Example 18 so as to obtain an electrolyte body having a thickness of 0.5 mm.

EXAMPLE 21

In the first step, a retaining material consisting of a mixture of first fine particles of α-lithium aluminate having an average particle diameter of 0.4 μm and second fine particles of lithium zirconate ($Li_2ZrO_3$) having the same average particle diameter as the first fine particles and a reinforcing material consisting of short fibers of γ-lithium aluminate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30.

Then, a porous body was prepared as in Example 18 by using the slurry, followed by impregnating the porous body with an alkali carbonate mixture equal to that used in Example 18 so as to obtain an electrolyte body having a thickness of 0.5 mm.

EXAMPLE 22

In the first step, a retaining material consisting of a mixture of first fine particles of α-lithium aluminate having an average particle diameter of 0.4 μm and second fine particles of lithium niobate ($LiNbO_3$) having the same average particle diameter as the first fine particles and a reinforcing material consisting of short fibers of γ-lithium aluminate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30.

Then, a porous body was prepared as in Example 18 by using the slurry, followed by impregnating the porous body with an alkali carbonate mixture equal to that used in Example 18 so as to obtain an electrolyte body having a thickness of 0.5 mm.

EXAMPLE 23

In the first step, a retaining material consisting of a mixture of first fine particles of α-lithium aluminate having an average particle diameter of 0.4 μm and second fine particles of lithium tantalate having the same average particle diameter as the first fine particles and a reinforcing material consisting of short fibers of γ-lithium aluminate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30. Then, a porous body was prepared as in Example 18 by using the slurry, followed by impregnating the porous body with an alkali carbonate mixture equal to that used in Example 18 so as to obtain an electrolyte body having a thickness of 0.5 mm.

EXAMPLE 24

In the first step, a retaining material consisting of a mixture of first fine particles of α-lithium aluminate having an average particle diameter of 0.4 μm and second fine particles of lithium tantalate having the same average particle diameter as the first fine particles and a reinforcing material consisting of short fibers of lithium titanate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30.

Then, a porous body was prepared as in Example 18 by using the slurry, followed by impregnating the porous body with an alkali carbonate mixture equal to that used in Example 18 so as to obtain an electrolyte body having a thickness of 0.5 mm.

EXAMPLE 25

In the first step, a retaining material consisting of a mixture of first fine particles of α-lithium aluminate having an average particle diameter of 0.4 μm and second fine particles of lithium tantalate having the same average particle diameter as the first fine particles and a reinforcing material consisting of short fibers of lithium zirconate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30.

Then, a porous body was prepared as in Example 18 by using the slurry, followed by impregnating the porous body with an alkali carbonate mixture equal to that used in Example 18 so as to obtain an electrolyte body having a thickness of 0.5 mm.

EXAMPLE 26

In the first step, a retaining material consisting of a mixture of first fine particles of α-lithium aluminate having an average particle diameter of 0.4 μm and second fine particles of lithium tantalate having the same average particle diameter as the first fine particles and a reinforcing material consisting of short fibers of lithium niobate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30.

Then, a porous body was prepared as in Example 18 by using the slurry, followed by impregnating the porous body with an alkali carbonate mixture equal to that used in Example 18 so as to obtain an electrolyte body having a thickness of 0.5 mm.

EXAMPLE 27

In the first step, a retaining material consisting of a mixture of first fine particles of α-lithium aluminate having an average particle diameter of 0.4 μm and second fine particles of lithium tantalate having the same average particle diameter as the first fine particles and a reinforcing material consisting of short fibers of lithium tantalate having an average diameter of 2 μm and an average length of 30 μm were put in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the volume ratio of the first fine particles to the second fine particles of the retaining material was 70:30.

Then, a porous body was prepared as in Example 18 by using the slurry, followed by impregnating the porous body with an alkali carbonate mixture equal to that used in Example 18 so as to obtain an electrolyte body having a thickness of 0.5 mm.

EXAMPLE 28

In the first step, a retaining material consisting of fine particles of α-lithium aluminate having an average particle diameter of 0.4 μm and a reinforcing material consisting of short fibers of γ-lithium aluminate having an average diameter of 2 μm and an average length of 30 μm were put in an alumina pot in a volume ratio of 70:30 together with polyvinyl butyral, dibutyl phthalate and toluene, and these materials were subjected to a wet mixing within the alumina pot for 20 hours so as to prepare a slurry.

Then, a porous body was prepared as in Example 18 by using the slurry, followed by impregnating the porous body with an alkali carbonate mixture equal to that used in Example 1 so as to obtain an electrolyte body having a thickness of 0.5 mm.

EXAMPLE 29

In the first step, a retaining material consisting a mixture of fine particles of γ-lithium aluminate having an average particle diameter of 0.4 μm and fine particles of lithium tantalate having the same average particle diameter and a reinforcing material consisting of short fibers of γ-lithium aluminate having an average diameter of 2 μm and an average length of 30 μm were put in an alumina pot in an alumina pot together with polyvinyl butyral, dibutyl phthalate and toluene, and these materials were subjected to a wet mixing within the alumina pot for 20 hours so as to prepare a slurry. The volume ratio of the retaining material to the reinforcing material was 70:30. Also, the fine particles of γ-lithium aluminate and the fine particles of lithium tantalate were mixed at a mixing ratio by volume of 70:30 to prepare the retaining material.

Then, a porous body was prepared as in Example 18 by using the slurry, followed by impregnating the porous body with an alkali carbonate mixture equal to that used in Example 1 so as to obtain an electrolyte body having a thickness of 0.5 mm.

A molten carbonate fuel cell constructed as shown in FIGS. 2 and 3 was prepared by using the electrolyte body prepared in each of Examples 18 to 28 and Comparative Examples 1, 2, 12, and 15, an anode made of a nickel-based alloy, a cathode made of a nickel-based alloy, a separator made of a stainless steel, an edge plate made of a stainless steel, and a corrugated plate made of a stainless steel.

The fuel cell thus prepared was operated under a pressure of 5 atms., and subjected to a power generating test at 700° C. with a load condition of 150 mA/cm$^2$ by supplying a fuel gas consisting of 80% by volume of a hydrogen gas ($H_2$) and 20% by volume of a carbon dioxide gas ($CO_2$) to the anode and an oxidant gas consisting of 70% by volume of air and 30% by volume of $CO_2$ gas to the cathode. In this test, the fuel gas consisting of the hydrogen gas and the carbon dioxide gas was humidified with a water vapor having a partial pressure of 1 atm. The power generating test was continuously performed for 2,000 hours, with a heat cycle applied 5 times during the test. After the power generating test performed for 2,000 hours, a helium gas (He) was added in an amount of 10% by volume to the fuel gas supplied to the anode consisting of 80% by volume of $H_2$ gas and 20% by volume of $CO_2$ gas, while supplying the oxidant gas consisting of 70% by volume of air and 30% by volume of $CO_2$ to the cathode. Under this condition, a gas cross-leak amount was obtained by measuring the He concentration of the exhaust gas from the cathode. In other words, the gas cross-leak was evaluated for the case of operating the fuel cell under a humidified condition, which is severer than the condition for the test applied to the electrolyte body prepared in each of Examples 1 to 17, for increasing the cell output. Table 2 shows the results.

TABLE 2

| | Retaining Material (fine particles) | | Reinforcing Material | | | Gas |
| --- | --- | --- | --- | --- | --- | --- |
| | | Average Particle Diameter (μm) | | Fiber | | Crossleak Amount (%) |
| | Kind | | Kind | Average Diameter (μm) | Average Length (μm) | |
| Example 18 | α-LiAlO$_2$ + LiTaO$_3$ | 0.2 | γ-LiAlO$_2$ | 2 | 30 | 0.9 |
| Example 19 | α-LiAlO$_2$ + LiTaO$_3$ | 0.6 | γ-LiAlO$_2$ | 2 | 30 | 1.0 |
| Example 20 | α-LiAlO$_2$ + LiTiO$_2$ | 0.4 | γ-LiAlO$_2$ | 2 | 30 | 0.9 |
| Example 21 | α-LiAlO$_2$ + Li$_2$ZrO$_3$ | 0.4 | γ-LiAlO$_2$ | 2 | 30 | 0.8 |
| Example 22 | α-LiAlO$_2$ + LiNbO$_3$ | 0.4 | γ-LiAlO$_2$ | 2 | 30 | 0.9 |
| Example 23 | α-LiAlO$_2$ + LiTaO$_3$ | 0.4 | γ-LiAlO$_2$ | 2 | 30 | 0.7 |
| Example 24 | α-LiAlO$_2$ + LiTaO$_3$ | 0.4 | LiTiO$_2$ | 2 | 30 | 0.4 |
| Example 25 | α-LiAlO$_2$ + LiTaO$_3$ | 0.4 | Li$_2$ZrO$_3$ | 2 | 30 | 0.3 |
| Example 26 | α-LiAlO$_2$ + LiTaO$_3$ | 0.4 | LiNbO$_3$ | 2 | 30 | 0.4 |
| Example 27 | α-LiAlO$_2$ + LiTaO$_3$ | 0.4 | LiTaO$_3$ | 2 | 30 | 0.4 |
| Example 28 | α-LiAlO$_2$ | 0.4 | γ-LiAlO$_2$ | 2 | 30 | 2.3 |
| Example 29 | γ-LiAlO$_2$ + LiTaO$_3$ | 0.4 | γ-LiAlO$_2$ | 2 | 30 | 3.1 |
| Comparative example 1 | α-LiAlO$_2$ | 0.4 | — | — | — | 7.4 |
| Comparative example 2 | α-LiAlO$_2$ | 0.4 | γ-LiAlO$_2$ (Large particles having average particle diameter of 30 μm) | | | 6.6 |
| Comparative example 12 | γ-LiAlO$_2$ | 0.4 | γ-LiAlO$_2$ | 2 | 300 | 6.1 |
| Comparative example 15 | γ-LiAlO$_2$ | 0.4 | Li$_2$ZrO$_3$ | 10 | 70 | 5.4 |

The electrolyte body prepared in each of Examples 8 to 26 included a porous body containing a retaining material consisting of a mixture of first fine particles of α-lithium aluminate having an average particle diameter of 0.2 to 0.6 μm and second fine particles made of a material selected from the group consisting of lithium zirconate, stabilized zirconia, lithium tantalate, lithium niobate and lithium titanate and having an average particle diameter of 0.2 to 0.6 μm and a reinforcing material consisting of short fibers made of a material selected from the group consisting of lithium aluminate, lithium zirconate, stabilized zirconia, lithium tantalate, lithium niobate and lithium titanate.

As apparent from Table 2, the gas cross-leak amount after operation for 2,000 hours, during which a heat cycle was applied 5 times, of the fuel cell comprising the electrolyte body prepared in any of Examples 18 to 26 was not larger than 1% relative to the cathode gas flow rate on the outlet side. This clearly supports that the molten carbonate fuel cell of the present invention exhibits a long life time and a high reliability.

On the other hand, the electrolyte body prepared in each of Examples 27 and 28 included a porous body containing a retaining material, which does not include the first fine particles or the second fine particles described above as an indispensable component, and a reinforcing material containing short fibers made of a material selected from the group consisting of lithium aluminate, lithium zirconate, stabilized zirconia, lithium tantalate, lithium niobate and lithium titanate, and having a predetermined average diameter and a predetermined average length. In this case, the gas crossleak amount after operation for 2,000 hours under a humidified condition, during which a heat cycle was applied 5 times, of the fuel cell comprising the particular electrolyte body was 2 to 3% relative to the cathode gas flow rate on the outlet side. In other words, the electrolyte body included in the fuel cell was found to be inferior in its capability of retaining the electrolyte and in its resistance to cracks, compared with the electrolyte body prepared in each of Examples 18 to 26. However, the fuel cell comprising the electrolyte body prepared in each of Examples 27 and 28 was found to be superior to the fuel cell comprising the electrolyte body prepared in each of Comparative Examples 1, 2, 12 and 15, in which the gas cross-leak amount after operation for 2,000 hours under a humidified condition, during which a heat cycle was applied 5 times, of the fuel cell comprising the particular electrolyte body was larger than 5% relative to the cathode gas flow rate on the outlet side.

As described above in detail, the present invention provides a molten carbonate fuel cell, which permits improving the mechanical strength of the electrolyte body and also permits suppressing the outflow of the electrolyte from the electrolyte body. It follows that it is possible to suppress an increase in the internal resistance of the fuel cell and an occurrence of a gas crossover, which accompany the outflow of the electrolyte, leading to a long life time of the molten carbonate fuel cell.

What should also be noted is that the electrolyte body included in the molten carbonate fuel cell of the present invention exhibits an improved stability and an improved mechanical strength during operation of the fuel cell under a high temperature and a humidified condition so as to suppress the outflow of the electrolyte from the electrolyte body. It follows that it is possible to suppress an increase in the internal resistance of the fuel cell and an occurrence of a gas crossover, which accompany the outflow of the electrolyte, during operation of the fuel cell under a high temperature and a humidified condition, leading to a high power output and a long life time of the molten carbonate fuel cell.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A molten carbonate fuel cell, comprising:

a pair of conductive electrodes;

an electrolyte body sandwiched between the pair of electrodes and including a porous body containing a retaining material and a reinforcing material and an electrolyte impregnated in said porous body and containing an alkali carbonate mixture, said retaining material containing fine particles having an average particle diameter of 0.2 to 0.6 μm and said reinforcing material containing short fibers having an average diameter of 0.5 to 5 μm and an average length of at most 50 μm;

fuel gas supplying means for supplying a fuel gas to one of the pair of electrodes; and oxidant gas supplying means for supplying an oxidant gas to the other of the pair of electrodes.

2. The molten carbonate fuel cell according to claim 1, wherein particles having particle diameters falling within a range of ±60% of the average particle diameter of 0.2 to 0.6 μm occupy at least 80% by volume of said fine particles constituting said retaining material.

3. The molten carbonate fuel cell according to claim 1, wherein said fine particles constituting said retaining material are made of at least one material selected from the group consisting of lithium aluminate, lithium zirconate, stabilized zirconia, lithium tantalate, lithium niobate and lithium titanate.

4. The molten carbonate fuel cell according to claim 1, wherein said retaining material contains fine particles of α-lithium aluminate.

5. The molten carbonate fuel cell according to claim 1, wherein said short fibers constituting said reinforcing material are made of at least one material selected from the group consisting of lithium aluminate, lithium zirconate, stabilized zirconia, lithium tantalate, lithium niobate and lithium titanate.

6. The molten carbonate fuel cell according to claim 3 or 5, wherein said retaining material and said reinforcing material are made of different materials.

7. The molten carbonate fuel cell according to claim 1, wherein the volume ratio of said retaining material to said reinforcing material of said porous body falls within a range of between 5:5 and 9:1.

8. The molten carbonate fuel cell according to claim 1, wherein said porous body has a porosity of 40 to 65%.

9. The molten carbonate fuel cell according to claim 1, wherein said reinforcing fibers are selected from the group consisting of lithium tantalate, lithium niobate and lithium titanate.

10. The molten carbonate fuel cell according to claim 1, wherein the short fibers of said reinforcing material have an average diameter of not more than 2 μm.

11. The molten carbonate fuel cell according to claim 10, wherein said reinforcing fibers are selected from the group consisting of lithium tantalate, lithium niobate and lithium titanate.

12. A molten carbonate fuel cell, comprising:

a pair of conductive electrodes;

an electrolyte body sandwiched between the pair of electrode, and comprising, (a) a porous body including a retaining material containing a mixture of first fine particles and second fine particles and a reinforcing material, said first fine particles being made of α-lithium aluminate and having an average particle diameter of 0.2 to 0.6 μm, said second fine particles being made of at least one material selected from the group consisting of lithium zirconate, stabilized zirconia, lithium tantalate, lithium niobate and lithium titanate and having an average particle diameter of 0.2 to 0.6 μm, and said reinforcing material containing short fibers selected from the group consisting of lithium zirconate, stabilized zirconia, lithium tantalate, lithium niobate and lithium titanate, and (b) an electrolyte impregnated in said porous body and containing an alkali carbonate mixture;

fuel gas supplying means in said porous body and containing an alkali carbonate mixture;

fuel gas supplying means for supplying a fuel gas to one of the pair of electrodes; and oxidant gas supplying means for supplying an oxidant gas to the other of the pair of electrodes.

13. The molten carbonate fuel cell according to claim 12, wherein particles having particle diameters falling within a range of ±60% of the average particle diameter of 0.2 to 0.6 μm occupy at least 80% by volume of each of said first and second fine particles constituting said retaining material.

14. The molten carbonate fuel cell according to claim 12, wherein said first and second fine particles constituting said retaining material are mixed in a mixing ratio by volume of 5:5 to 9:1.

15. The molten carbonate fuel cell according to claim 12, wherein said first and second fine particles constituting said retaining material are mixed in a mixing ratio by volume of 6:4 to 8:2.

16. The molten carbonate fuel cell according to claim 12, wherein said short fibers constituting said reinforcing material have an average diameter of 0.5 to 5 μm and an average length of at most 50 μm.

17. The molten carbonate fuel cell according to claim 12, wherein said retaining material contains first fine particles of α-lithium aluminate and second fine particles lithium zirconate, and said reinforcing material contains short fibers of lithium aluminate or lithium zirconate.

18. The molten carbonate fuel cell according to claim 12, wherein the mixing ratio by volume of said retaining material to said reinforcing material within the porous body falls within a range of between 5:5 and 9:1.

19. The molten carbonate fuel cell according to claim 12, wherein said porous body has a porosity of 40 to 65%.

20. The molten carbonate fuel cell according to claim 12, wherein the short fibers of said reinforcing material have an average diameter of not more than 2 μm.

21. The molten carbonate fuel cell according to claim 12, wherein said reinforcing fibers are selected from the group consisting of lithium tantalate, lithium niobate and lithium titanate.

22. The molten carbonate fuel cell according to claim 12, wherein said second fine particles are selected from the group consisting of lithium tantalate, lithium niobate and lithium titanate.

* * * * *